(12) United States Patent
Steele et al.

(10) Patent No.: US 9,149,750 B2
(45) Date of Patent: Oct. 6, 2015

(54) SINTER BONDED POROUS METALLIC COATINGS

(75) Inventors: James K. Steele, Rockfall, CT (US); Wayne F. White, Granby, CT (US); Alfred M. Romano, Hartland, CT (US); Kenneth L. Rubow, Avon, CT (US)

(73) Assignee: Mott Corporation, Farmington, CT (US)

( * ) Notice: Subject to any disclaimer, the term of this patent is extended or adjusted under 35 U.S.C. 154(b) by 280 days.

(21) Appl. No.: 13/364,478

(22) Filed: Feb. 2, 2012

(65) Prior Publication Data

US 2012/0183799 A1    Jul. 19, 2012

Related U.S. Application Data

(63) Continuation-in-part of application No. 11/827,688, filed on Jul. 13, 2007.

(60) Provisional application No. 61/439,176, filed on Feb. 3, 2011, provisional application No. 60/848,423, filed on Sep. 29, 2006.

(51) Int. Cl.
*B01D 39/02* (2006.01)
*B01D 39/20* (2006.01)
(Continued)

(52) U.S. Cl.
CPC .......... *B01D 39/201* (2013.01); *B01D 39/2027* (2013.01); *B01D 39/2034* (2013.01);
(Continued)

(58) Field of Classification Search
CPC ........ C23C 26/00; C23C 28/02; C23C 24/04; B01D 39/201
USPC ...................................................... 427/376.6
See application file for complete search history.

(56) References Cited

U.S. PATENT DOCUMENTS 2,522,082 A * 9/1950 Arnold .......................... 264/442
2,826,309 A * 3/1958 Forman et al. ................ 210/488
(Continued)

FOREIGN PATENT DOCUMENTS

JP    61244025 A    10/1986
JP    2254108 A    10/1990
(Continued)

OTHER PUBLICATIONS

Wegner, Dr. Christian and Swiniarski, Ed; Porous Metal Filter Products and the LC System; published by Applied Porous Technologies; 2004.

(Continued)

*Primary Examiner* — Tabatha Penny
(74) *Attorney, Agent, or Firm* — Wiggins and Dana LLP; Gregory S. Rosenblatt

(57) ABSTRACT

A composite structure includes a substrate with pores of a first mean pore size and a coating on at least one surface of that substrate. This coating has pores of a second mean pore size where the first mean pore size is equal to or greater than said second mean pore size. When the pore size of the coating is effective to capture particulate greater than 0.2 micron, the composite may be formed into a filter effective to remove microbes from a fluid medium. One method to form the porous coating on the substrate includes: (1) forming a suspension of sinterable particles in a carrier fluid and containing the suspension in a reservoir; (2) maintaining the suspension by agitation; (3) transferring the suspension to an ultrasonic spray nozzle; (4) applying a first coating of the suspension to the substrate; and (5) sintering the sinterable particles to the substrate.

18 Claims, 13 Drawing Sheets

(51) Int. Cl.

| | | |
|---|---|---|
| *B01J 2/00* | (2006.01) | |
| *B01J 2/04* | (2006.01) | |
| *B01J 2/18* | (2006.01) | |
| *B01J 23/42* | (2006.01) | |
| *B01J 35/04* | (2006.01) | |
| *B22F 1/00* | (2006.01) | |
| *B22F 3/11* | (2006.01) | |
| *B22F 5/10* | (2006.01) | |
| *B22F 7/00* | (2006.01) | |
| *B22F 7/02* | (2006.01) | |
| *B82Y 30/00* | (2011.01) | |
| *C22C 5/04* | (2006.01) | |
| *C22C 14/00* | (2006.01) | |
| *C22C 19/05* | (2006.01) | |
| *C22C 38/00* | (2006.01) | |
| *C23C 18/06* | (2006.01) | |
| *C23C 24/04* | (2006.01) | |
| *C23C 24/08* | (2006.01) | |
| *C22C 1/02* | (2006.01) | |

(52) U.S. Cl.
CPC . *B01J 2/006* (2013.01); *B01J 2/04* (2013.01); *B01J 2/18* (2013.01); *B01J 23/42* (2013.01); *B01J 35/04* (2013.01); *B22F 1/0018* (2013.01); *B22F 3/1103* (2013.01); *B22F 5/106* (2013.01); *B22F 7/002* (2013.01); *B22F 7/02* (2013.01); *B82Y 30/00* (2013.01); *C22C 1/02* (2013.01); *C22C 5/04* (2013.01); *C22C 14/00* (2013.01); *C22C 19/056* (2013.01); *C22C 38/00* (2013.01); *C23C 18/06* (2013.01); *C23C 24/04* (2013.01); *C23C 24/08* (2013.01); *B01D 2239/0258* (2013.01); *B01D 2239/0478* (2013.01); *B01D 2239/0654* (2013.01); *B01D 2239/083* (2013.01); *B01D 2239/10* (2013.01); *B01D 2239/1216* (2013.01); *B01D 2239/1241* (2013.01); *Y10T 428/12042* (2015.01); *Y10T 428/12479* (2015.01); *Y10T 428/13* (2015.01); *Y10T 428/249981* (2015.04)

(56) References Cited

U.S. PATENT DOCUMENTS

| | | | |
|---|---|---|---|
| 3,133,829 A | | 5/1964 | Cupery et al. |
| 3,248,093 A | * | 4/1966 | Demaison ............... 366/13 |
| 3,257,245 A | | 6/1966 | Cannaday |
| 3,278,165 A | * | 10/1966 | Gaffney ............... 366/119 |
| 3,855,638 A | | 12/1974 | Pilliar |
| 3,975,165 A | | 8/1976 | Elbert et al. |
| 4,120,792 A | | 10/1978 | Clark et al. |
| 4,459,252 A | | 7/1984 | MacGregor |
| 4,501,500 A | | 2/1985 | Terrels |
| 4,526,839 A | | 7/1985 | Herman et al. |
| 4,562,039 A | | 12/1985 | Koehler |
| 4,613,369 A | | 9/1986 | Koehler |
| 4,800,187 A | | 1/1989 | Lachman et al. |
| 4,849,274 A | | 7/1989 | Cornelison |
| 4,895,609 A | | 1/1990 | Baldi |
| 4,936,315 A | | 6/1990 | Lineback |
| 5,034,186 A | | 7/1991 | Shimamune et al. |
| 5,080,672 A | | 1/1992 | Bellis |
| 5,132,080 A | | 7/1992 | Pfeil |
| 5,135,903 A | | 8/1992 | Birkenstock et al. |
| 5,149,360 A | | 9/1992 | Koehler et al. |
| 5,342,431 A | | 8/1994 | Anderson et al. |
| 5,364,586 A | | 11/1994 | Trusov et al. |
| 5,487,771 A | | 1/1996 | Zeller |
| 5,492,623 A | | 2/1996 | Ishibe |
| 5,508,114 A | | 4/1996 | Sugikawa |
| 5,531,955 A | | 7/1996 | Sugikawa |
| 5,585,020 A | | 12/1996 | Becker et al. |
| 5,626,923 A | * | 5/1997 | Fitzgibbons et al. ......... 427/535 |
| 5,814,272 A | | 9/1998 | Zeller et al. |
| 5,885,653 A | | 3/1999 | Waldenstrom et al. |
| 5,985,368 A | | 11/1999 | Sangeeta et al. |
| 6,038,060 A | | 3/2000 | Crowley |
| 6,268,014 B1 | | 7/2001 | Eberspacher et al. |
| 6,315,954 B1 | | 11/2001 | Small et al. |
| 6,358,567 B2 | * | 3/2002 | Pham et al. ............... 427/115 |
| 6,432,308 B1 | | 8/2002 | Gill |
| 6,465,052 B1 | | 10/2002 | Wu |
| 6,531,100 B1 | | 3/2003 | Ogata et al. |
| 6,544,472 B1 | | 4/2003 | Compton et al. |
| 6,557,342 B2 | | 5/2003 | Suga et al. |
| 6,579,573 B2 | | 6/2003 | Strutt et al. |
| 6,583,071 B1 | | 6/2003 | Weidman et al. |
| 6,595,117 B1 | | 7/2003 | Jones et al. |
| 6,630,016 B2 | | 10/2003 | Koslow |
| 6,641,917 B2 | | 11/2003 | Itsukaichi et al. |
| 6,652,804 B1 | | 11/2003 | Neumann et al. |
| 6,709,622 B2 | | 3/2004 | Billiet et al. |
| 6,737,376 B1 | | 5/2004 | Heckmann et al. |
| 6,803,138 B2 | | 10/2004 | Seabaugh et al. |
| 6,849,230 B1 | | 2/2005 | Feichtinger |
| 6,889,852 B1 | | 5/2005 | Loncke et al. |
| 6,916,454 B2 | | 7/2005 | Alvin |
| 6,926,969 B2 | | 8/2005 | Bohm et al. |
| 6,945,448 B2 | | 9/2005 | Medlin et al. |
| 7,045,015 B2 | | 5/2006 | Renn et al. |
| 7,052,532 B1 | | 5/2006 | Liu et al. |
| 7,112,237 B2 | | 9/2006 | Zeller et al. |
| 7,166,323 B2 | | 1/2007 | Chung et al. |
| 2001/0003010 A1 | | 6/2001 | Pham et al. |
| 2002/0006470 A1 | * | 1/2002 | Eberspacher et al. ......... 427/216 |
| 2002/0074282 A1 | | 6/2002 | Herrmann et al. |
| 2002/0086189 A1 | | 7/2002 | Pham et al. |
| 2002/0195188 A1 | | 12/2002 | Kuhstoss et al. |
| 2003/0194600 A1 | | 10/2003 | Pan |
| 2004/0072010 A1 | | 4/2004 | Date et al. |
| 2004/0137209 A1 | * | 7/2004 | Zeller et al. ............... 428/304.4 |
| 2004/0168418 A1 | | 9/2004 | Jha et al. |
| 2004/0201119 A1 | * | 10/2004 | Kuhstoss et al. ............... 264/44 |
| 2004/0237780 A1 | | 12/2004 | Ma et al. |
| 2006/0134347 A1 | | 6/2006 | Chiruvolu et al. |
| 2006/0144770 A1 | | 7/2006 | Granger et al. |
| 2006/0147699 A1 | | 7/2006 | Sarkar et al. |
| 2007/0039299 A1 | | 2/2007 | Zeller et al. |
| 2007/0184204 A1 | * | 8/2007 | Balagopal et al. ......... 427/419.2 |
| 2008/0081007 A1 | | 4/2008 | Steele et al. |
| 2008/0174040 A1 | | 7/2008 | Saukaitis et al. |
| 2008/0193657 A1 | * | 8/2008 | Raybould et al. ............ 427/397.7 |
| 2009/0018366 A1 | | 1/2009 | Berweiler et al. |
| 2011/0033609 A1 | | 2/2011 | Jiang et al. |

FOREIGN PATENT DOCUMENTS

| | | | | |
|---|---|---|---|---|
| JP | 3013508 A | | 1/1991 | |
| JP | 7323246 | | 12/1995 | |
| JP | 2002038203 A | | 2/2002 | |
| JP | 2002254253 A | | 9/2002 | |
| JP | 2002270210 A | | 9/2002 | |
| JP | 2003345095 | | 3/2003 | |
| JP | 2003097253 A | | 4/2003 | |
| JP | 2003290695 A | | 10/2003 | |
| JP | 2005097699 A | | 4/2005 | |
| JP | 2006089372 | | 4/2006 | |
| JP | 2004332069 | | 11/2014 | |
| WO | 9112879 A1 | | 9/1991 | |
| WO | WO 91/18682 | * | 12/1991 | ............... B05D 1/02 |
| WO | 0020106 A2 | | 4/2000 | |
| WO | 2004031445 A1 | | 4/2004 | |
| WO | WO 2004/031445 | * | 4/2004 | ............. C23C 18/02 |
| WO | 2008041969 A1 | | 4/2008 | |

OTHER PUBLICATIONS

PCT/US07/19102; International Search Report and Written Opinion; published by World Intellectual Property Organization; Jun. 2008.
EP 07837555.7; Supplementary European Search Report; published by European Patent Office; Jun. 2011.

(56) References Cited

OTHER PUBLICATIONS

Korean Patent Application No. 10-2009-7007524; Notice of Preliminary Rejection from the Korean Intellectual Property Office; Jan. 7, 2014.
JP 2009-530349; Translation of Official Action; Nov. 27, 2012.
EP 12153577.7; Extended European Search Report; European Patent Office; Jun. 15, 2012.
Japanese Patent Office, JP 2012-020521, Notification of Reason(s) for Rejection, Issued Sep. 26, 2014.
KR10-2009-007524, "Final Notice of Preliminary Rejection". Mailed Sep. 3, 2014.
JP2013-213667. Translation of Office Action from Japanese Patent Office, mailed Oct. 17, 2014.

* cited by examiner

SINTER BONDED POROUS METALLIC COATINGS

CROSS REFERENCE TO RELATED APPLICATION

This patent application is a continuation-in-part of U.S. patent application Ser. No. 11/827,688, titled "Sinter Bonded Porous Metallic Coatings," that was filed on Jul. 13, 2007. This patent application also claims a benefit to the filing date of U.S. Provisional Patent Application Ser. No. 61/439,176, titled "Sinter Bonded Porous Metallic Coatings," that was filed on Feb. 3, 2011. The disclosures of both U.S. Ser. No. 11/827,688 and U.S. 61/439,176 are incorporated herein by reference in their entireties.

U.S. GOVERNMENT RIGHTS

N.A.

BACKGROUND

1. Field

Disclosed herein is a method to form a porous metallic coating on a substrate. More particularly, a suspension of nanosize particles in a carrier fluid is deposited on the substrate and heated to evaporate the carrier fluid while sintering the particles to the substrate.

2. Description of the Related Art

There are numerous applications requiring a porous open cell structure including filtration and gas or liquid flow control. These structures are typically formed by compacting metallic or ceramic particles to form a green compact and then sintering to form a coherent porous structure. Particle size, compaction force, sintering time and sintering temperature all influence the pore size and the structure strength. When the pore size is relatively large, such as microsize (having an average diameter of one micron (m) or greater), the structure thickness relative to pore size is modest for sufficient strength to be handled and utilized in industrial applications. When the pore size is relatively small, such as nanosize (having an average diameter of less than one micron), the structure thickness is much greater than pore size for sufficient strength to be handled and utilized in industrial applications. As a result, the structure has high resistance to passing a gas or liquid through the long length, small diameter pores and there is a high pressure drop across the filter. Note that for this application, the diameter is to be measured along the longest axis passing from one side of a particle to the other side and also passing through the particle center.

A number of patents disclose methods for depositing a porous coating on a substrate. U.S. Pat. No. 6,544,472 discloses a method for depositing a porous surface on an orthopedic implant. Metallic particles are suspended in a carrier fluid. The carrier fluid may contain water, gelatin (as a binder) and optionally glycerin (as a viscosity enhancer). Evaporation of the water results in the metallic particles being suspended in a gelatinous binder. Heating converts the gelatin to carbon and sinters the metallic particles to the substrate.

U.S. Pat. No. 6,652,804 discloses a method for the manufacture of a thin openly porous metallic film. Metal particles with an average particle diameter between one micron and 50 microns are suspended in a carrier fluid having as a primary component an alcohol, such as ethanol or isopropanol, and a binder. This suspension is applied to a substrate and heated to evaporate the alcohol component. A green film of microparticles suspended in the binder is then removed from the substrate and heated to a temperature effective to decompose the binder and sinter the metallic particles.

U.S. Pat. No. 6,702,622 discloses a porous structure formed by mechanical attrition of metal or ceramic particles to nanosize and then combining the nanosized particles with a binder, such as a mixture of polyethylene and paraffin wax to form a green part. The green part is then heated to a temperature effective to decompose the binder and sinter the particles.

U.S. Pat. Nos. 6,544,472; 6,652,804; and 6,709,622 are all incorporated by reference in their entireties herein.

In addition to the thickness constraint discussed above, the inclusion of a binder and optional viscosity enhancer may further increase the pressure drop across a structure. During sintering, the binder and viscosity enhancer decompose, typically to carbon. This carbonatious residue may in whole or in part block a significant number of pores necessitating a high pressure drop across the structure to support adequate flow.

There remains, therefore, a need for a method to deposit a thin nano powder layer on a substrate that does not suffer from the disadvantages of the prior art.

BRIEF SUMMARY

In accordance with an embodiment of the invention, there is provided a method for forming a porous coating on a substrate. This method includes the steps of (a) forming a suspension of sinterable particles in a carrier fluid; (b) maintaining the suspension by agitating the carrier fluid; (c) applying a first coating of the suspension to the substrate; and (d) sintering the sinterable particles to the substrate. An optional step (e) is to repeat steps (c) and (d) additional times as necessary to achieve desired thickness and performance. It is a feature of certain embodiments of the invention that a thin coating of a nano powder material may be deposited onto a substrate having micropores. A first advantage of this feature is that the microporous substrate provides strength and structure support and the nano powder layer may be quite thin. As a result, a nanoporous material which has sufficient strength for handling and industrial processes is provided. Since the nano powder layer is thin, the pressure drop across the layer is substantially less than conventional thicker nano powder structures.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

Like reference numbers and designations in the various drawings indicated like elements.

DETAILED DESCRIPTION

For purposes of this application, a "binder" is a carrier fluid component that remains after the carrier fluid is transformed from a liquid, such as by evaporation. A "viscosity enhancer" is a liquid that when added to the carrier fluid increases the viscosity of the carrier fluid beyond that of a primary component of the carrier fluid. A "suspension" is a mixture of a powder in a solvent. A "substrate" is a device or a part of a device to which the porous metallic coatings of the invention are applied. The substrate is typically porous, but may be solid in certain embodiments. A "nano powder coating" is the porous coating applied to the substrate from a powder having an average particle size of less than 10 microns.

Figure 1:
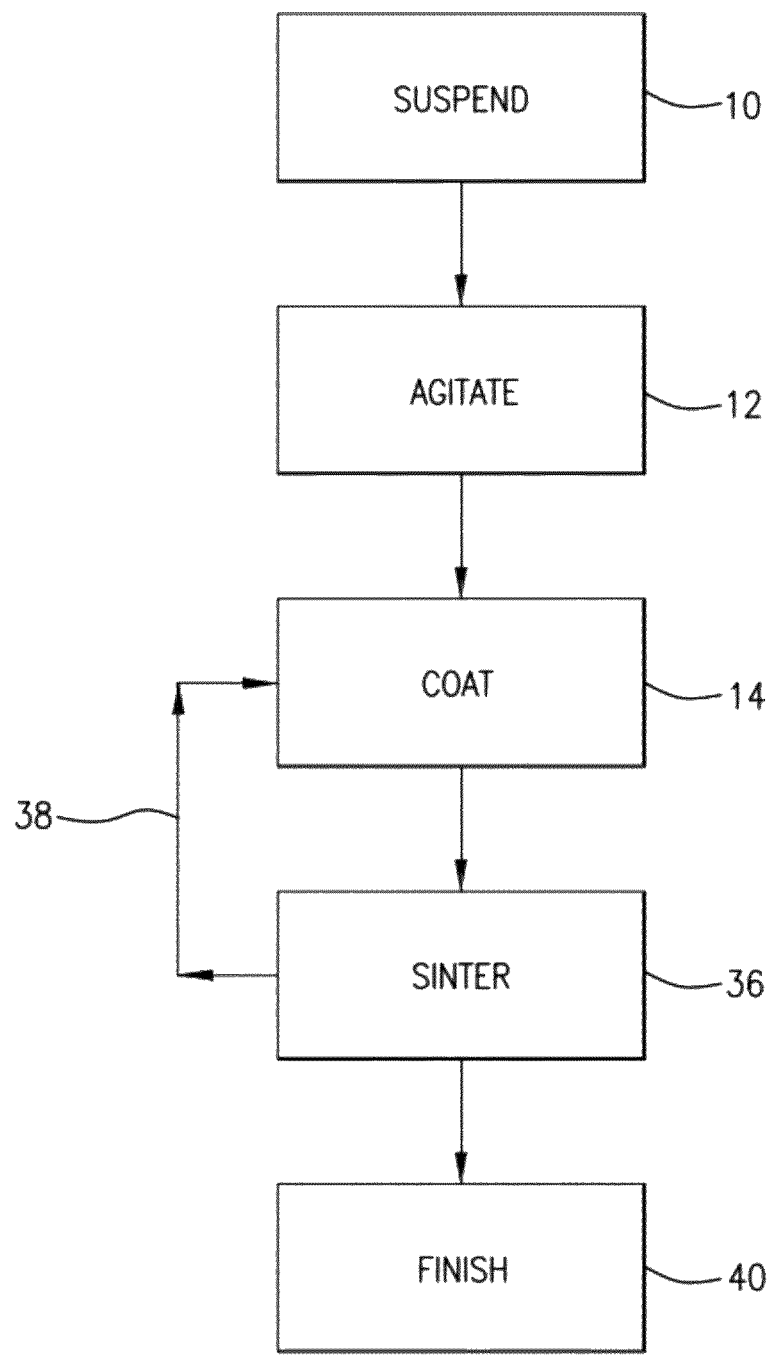
FIG. 1 illustrates in flow chart representation a method for depositing a porous coating in accordance with an embodiment of the invention.

As illustrated in flowchart representation in FIG. 1, the sinterable particles used to form a porous coating in accordance with the invention are suspended 10 in a carrier fluid. The concentration of sinterable particles is from 10 grams per liter to 200 grams per liter in the carrier fluid with a preferred concentration being about 100 grams per liter. The sinterable particles are typically nanosize and have an average maximum diameter sufficiently small to remain in solution in the carrier fluid in the presence of agitation without requiring an addition of a binder or viscosity enhancer. The sinterable particles preferably have an average maximum diameter of from 10 nanometers to 10 microns and more preferably have an average maximum diameter of from 10 nanometers to less than one micron. The sinterable particles are preferably metal or metal alloy powders but may also be other materials such as metal oxides and ceramics as long as such powders are capable of sinter bonding to each other and/or to a substrate. Preferred materials for the sinterable particles include stainless steel, nickel, cobalt, iron, copper, aluminum, palladium, titanium, platinum, silver, gold and their alloys and oxides. One particularly suitable alloy is Hastelloy C276 that has a nominal composition by weight of 15.5% chromium, 2.5% cobalt, 16.0% molybdenum, 3.7% tungsten, 15.0% iron, 1.0% manganese, 1.0% silicon, 0.03% carbon, 2.0% copper and the balance nickel.

The sinterable particles may be a mixture of materials. For example, a platinum powder may be mixed with 316L stainless steel, zinc, silver and tin powders to promote better adhesion of the coating at lower temperatures. Lower temperatures better retain the nano structure during the sintering process. The mixed coatings may be deposited from a suspension containing the mixture of powders and deposited simultaneously on to a substrate. Other benefits of applying a mixture of materials include mechanically alloying the coating, dilute and isolated particle distributions, enhanced bonding to the substrate at lower temperatures and controlled Thermal Coefficients of Expansion (TCE). Under the rule of mixtures, when 50% of component A and 50% of component B are combined and sintered, the coating would have a TCE that is the average of the respective TCE's of A and B. More than two components and other ratios of components may also be utilized and the TCE of the mixture calculated. For filter applications, such as described below in Example 8, the coating thickness is between 20 microns and 250 microns and preferably between 30 microns and 75 microns. The particles making up the coating preferably have an average particle size of from 50 nanometers to 350 nanometers and most preferably from 60 nanometers to 200 nanometers.

The carrier fluid is a liquid that evaporates essentially completely without a residue remaining dispersed in the sinterable particles. As such, the carrier fluid is substantially free of binders and viscosity enhancers. "Substantially free" means there is insufficient binder to form a compact without sintering and is nominally less than 0.05%, by volume. Preferred carrier fluids are alcohols. A most preferred alcohol for the carrier fluid is isopropanol (also referred to as isopropyl alcohol).

The suspension is formed in an inert atmosphere to prevent oxidation of the particles and because nanosized metallic particles are sometimes pyrophoric and may spontaneously ignite when exposed to air. The coating may be a mixture of different powders in which case these powders are first mixed in an inert atmosphere, such as argon. Once the powders are mixed, a carrier fluid is added to form the suspension. Nominally, equal volumes of carrier fluid and sinterable particles are utilized. However, other volume fractions may be used, dependant primarily on the method of deposition. While Brownian motion will cause the nanosized sinterable particles to remain in suspension for an extended period of time, agitation 12 is utilized to extend the period of suspension consistency. The agitation 12 may be by any effective means to maintain carrier fluid motion such as an impeller, ultrasonic vibration and combinations thereof.

A substrate is then coated 14 with the suspension by any suitable means such as spraying, rolling, dipping, use of a doctor blade, or other method by which a thin, uniform coating thickness of about five microns maybe deposited. As described below, a sequence of coating and sintering may be repeated multiple times to achieve a desired total coating thickness. The substrate may be porous or non-porous and may have either a rough or a smooth surface finish. The substrate is formed from a material to which the sinterable particles may be sinter bonded.

One preferred substrate is a porous metal having a thickness on the order of 0.1 inch and pores with an average diameter on the order of 5 μm. This substrate has sufficient strength to be handled and to withstand the rigors of an industrial process. At least one side of this substrate is coated with nanoporous particles by the method of the invention to a thickness effective to continuously coat the surface. This composite structure is effective for filtration and gas or liquid flow control on the nanoscale while having the strength and durability of a much coarser structure.

Figure 2:
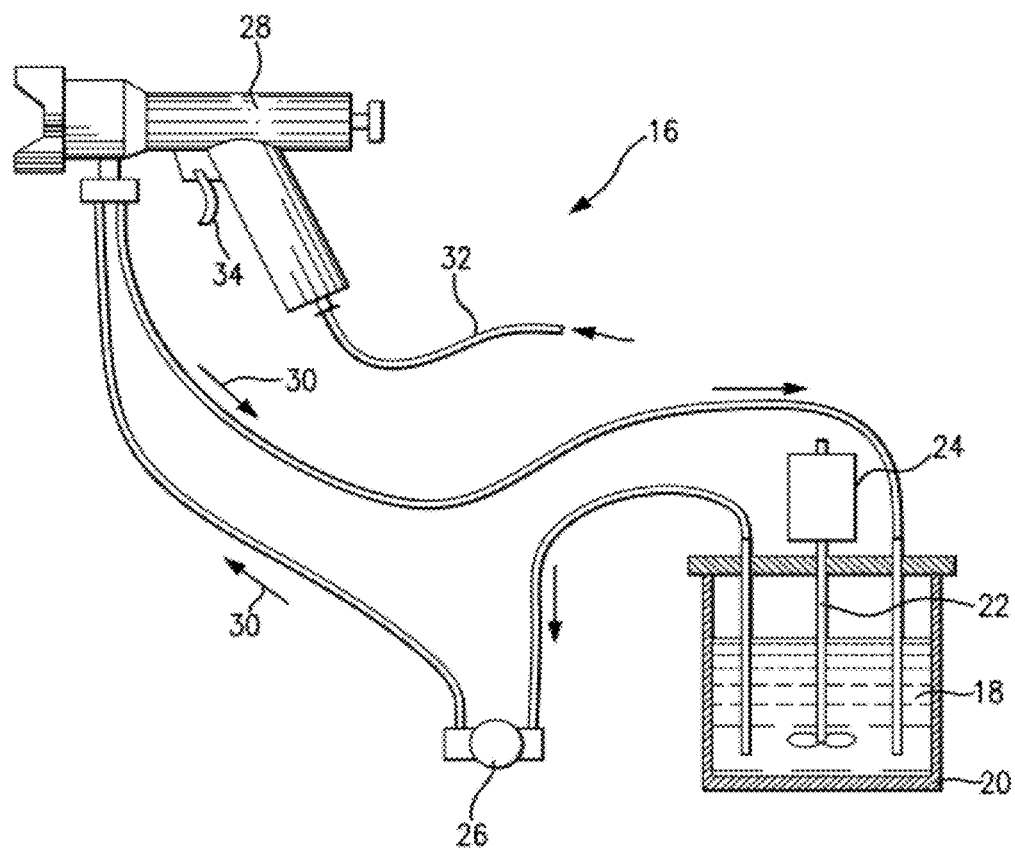
FIG. 2 schematically illustrates a system for depositing the porous coating formed in accordance with an embodiment of the invention.

One method to deposit porous coatings of the inventions utilizes the spray system 16 schematically illustrated in FIG. 2. A suspension 18 of sinterable particles in a carrier fluid is retained within a reservoir, such as pressure cup 20. An impeller 22 driven by a motor 24 or other means maintains the suspension 18 by agitation. Recirculating pump 26 draws the suspension 18 from the pressure cup 20 to a spray head 28 and returns nondeposited suspension back to pressure cup 20 in the direction generally indicated by arrows 30. The system 16 is pressurized from an external high pressure source 32 such as air pressurized to 40 psi. A positive pressure of about 1 psi is maintained in pressure cup 20. Depressing trigger 34 deposits a fine spray of suspension on a substrate (not shown).

Shop air has proven to be an acceptable external high pressure source. Other, more inert gases, such as nitrogen, may be used to pressurize the spray head. The use of nitrogen should result in less oxidation of the nano powders when spraying and provide a more uniform gas delivery in terms of consistent pressures and dryer gas as compared to conventional plant shop air. While, to date, the inventors have not observed a difference between the two gas pressurization systems, in certain application, the use of a more inert gas should be desirable.

FIG. 2 illustrates a system for the spray coat deposition of nano scale particles using modified, but conventional, air spray atomization similar to that used to paint automobiles and the like. Limitations with this technique developed when depositing nano scale particles. These limitations included significant overspray and impingement of the parts by a high velocity air stream. The overspray made control of the spray area difficult and also resulted in a large amount of wasted powder. The high velocity air made it difficult to spray small parts as the parts would move under the air flow.

Figure 3:
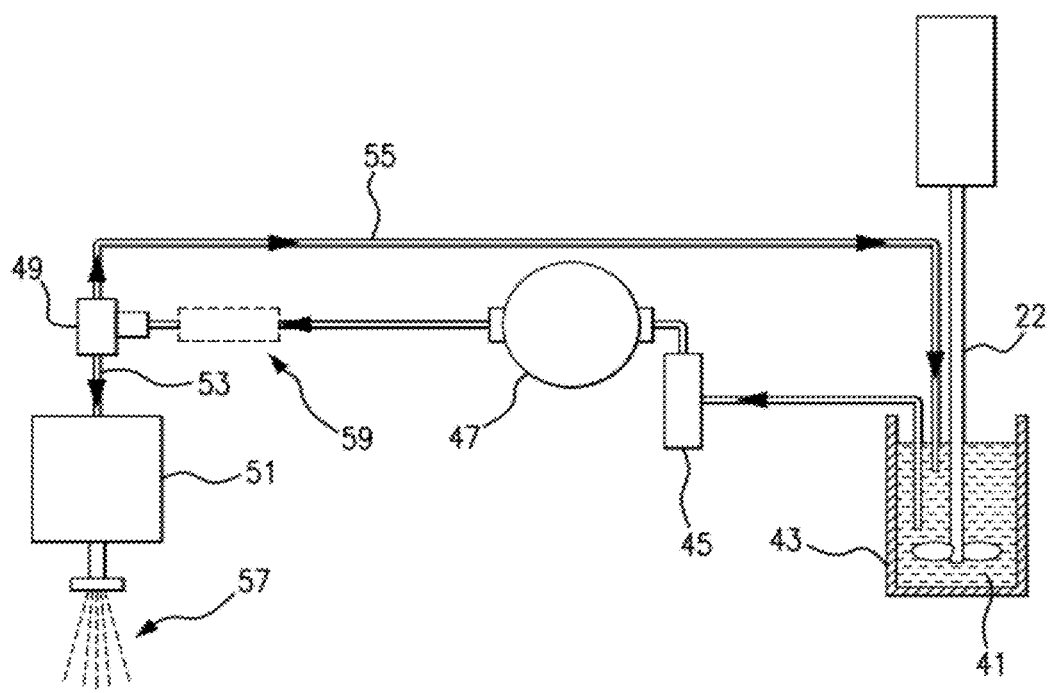
FIG. 3 schematically illustrates a system for depositing the porous coating formed in accordance with a second embodiment of the invention.

With reference to FIG. 3, switching to ultrasonic spray atomization avoids the limitations described above for air spray atomization. Instead of having a spray plume of several inches in diameter, as in air spray atomization, an ultrasonic spray nozzle produces a very small spray plume, usually less than 0.25 inch, resulting in much better control over where the coatings are applied. In addition, the ultrasonic spray nozzle uses a much lower air flow running at an air pressure range of about 5 to 60 inches $H_2O$ (0.18 to 2.17 psi) versus a pressure of about 30 psi or higher for conventional air spray systems. A value of 10 inches $H_2O$ works well for most coating applications and produces a gentle flow of air over the parts that does not push small parts around. When larger spray patterns are desired, the part to spray head distance is increased and, optionally, the air pressure is increased, exemplary to between 20 and 30 inches $H_2O$, to better define the spray pattern at the larger distances. A full range of 5 to 60 inches $H_2O$ for the system may likely be used dependent on the selected spray head type, distance from spray head to part and fluid delivery rate.

Exemplary operating parameters are 2 inches for the distance from the spray head to the parts being coated. This results in a spray plume diameter of about 0.375 inch on the parts. Moving the spray head closer reduces the size of the diameter of the spray plume and moving the spray head further away increases the spray plume pattern size. For the system illustrated in FIG. 3, the part to spray head distance can be adjusted from about 0.5 inch to about 12 inches. The power level of the ultrasonic spray head can be adjusted from 0.6 to 10 Watts. The higher the value, the more energy imparted into the spray slurry and greater levels of atomization are achieved. A setting of 6 Watts has been found to work well without generating too much heat at the spray head.

An additional benefit of ultrasonic atomization of the spray slurry is that the use of ultrasonics helps to break up agglomerates of nano particles helping to provide a smoother, denser, and more uniform coating of nano particles. This is highly desired for filtration applications or surface treatments where a smooth surface is desired.

A suspension 41 of nano particles in a carrier fluid is placed in a reservoir 43 that is continuously mixed with a mechanical impeller 22. Fluid suspension 41 is drawn from near the bottom of this reservoir 43 and fed into an ultrasonic inline agitator 45. The output of the ultrasonic inline agitator 45 is fed to the inlet of a gear pump 47. The suspension 41 is then pumped to the input of a 3-way selector valve 49. The directionality of the 3-way selector valve 49 depends on a mode of operation.

Mode 1—Suspension 41 flow is directed to an ultrasonic spray nozzle 51 at the desired coating fluid rate (usually 3 ml/min) when coating. Fluid line 53 is kept very short (less than 1 or 2 inches) to minimize settling and reduce the time for the system to stabilize when the 3-way selector valve 49 is actuated.

Mode 2—Suspension 41 flow is directed to return line 55 and directed to the fluid reservoir 43. The flow speed is increased to about 10 ml/min when not coating to remove any air bubbles in the system and to minimize settling of fluid throughout the fluid path.

The ultrasonic inline agitator 45 is placed in the fluid path of the suspension 41 to impart highly focused ultrasonic energy into the suspension to break agglomerates resulting in a more homogenous coating slurry. It uses the same technology that is used to atomize the suspension in the ultrasonic spray head 51 described above. The use of the ultrasonic inline agitator 45 helped to solve two main issues. First, it further reduced nano powder agglomeration in the coatings resulting in more dense and uniform coatings. Second, locating the ultrasonic inline agitator 51 at the input to the gear pump 47 greatly reduced fluid clogging in the gear pump 47 and provided more uniform slurry feed rates. The typical power setting that we have been using is 4 Watts. At this level, de-agglomeration appears to be adequate with minimal head build up in the device. Setting the power level too high (>6 Watts) appears to introduce cavitations in the suspension creating air bubbles which results in air pockets in the fluid line 53. This is undesirable as these air pockets create instabilities in the spray pattern while coating parts. In addition, if cavitations are present, they greatly shorten the life of the ultrasonic agitator.

One suitable ultrasonic inline agitator 45 is the Sono-Tek Ultrasonic Inline Agitator manufactured by Sono-Tek Corporation of Milton, N.Y. A second ultrasonic inline agitator 59 is optionally disposed between the gear pump 47 and the 3-way selector valve 49 to further break up any agglomerates in the fluid suspension.

A suitable gear pump 47 is the Zenith C9000 Precision Gear Pump manufactured by Zenith Pumps, Monroe, N.C. The pump dispenses a precise volume of fluid per shaft revolution. 0.3 ml/revolution is exemplary. A stepper motor (not shown) drives the gear pump and utilizes RS232/485 communication and/or 4 digital I/O lines (or the like) to program and control the gear pump 47 speed and direction. 0.125 inch compression fittings were fabricated to reduce the volume of internal cavities at the input and outlet of the pump. In addition, a polymer insert was installed to reduce the internal volume of the pumps input/drive shaft, again to reduce the internal cavities of the pump.

A suitable 3-way selector valve 49 is a pneumatically actuated valve manufactured by Swagelok Company, Cleveland, Ohio.

Exemplary operating steps when coating are: (1) reduce suspension 41 flow rate to desired rate while coating; (2) turn on ultrasonic spray nozzle 51; (3) direct suspension flow to ultrasonic spray nozzle via the 3-way valve 49; (4) wait a preset time for the spray to stabilize (usually less than 10 seconds); (5) spray parts; (6) switch 3-way valve to direct suspension to return to fluid reservoir 43; (7) turn off ultrasonic spray nozzle 51; and (8) increase suspension fluid speed to 10 ml/min or other preset value when not coating.

An exemplary clean up procedure is: (1) pull return line 55 from fluid reservoir 43 and pump suspension 41 fluid out of lines; (2) replace fluid in reservoir 43 with clean isopropyl alcohol (IPA); (3) circulate IPA through system for a couple minutes at 200 ml/min; (4) replace fluid with clean IPA and repeat above 4 times reversing direction every other time. If next operation is going to be a different alloy suspension, then all components will need to be disassembled and cleaned to reduce contamination.

Referring back to FIG. 1, following coating 14, the coated substrate is heated 36 for a time and temperature effective to evaporate the carrier fluid and sinter 36 the sinterable particles to the substrate. To prevent oxidation, sintering is typically in a neutral or reducing atmosphere or under a partial vacuum. While the sintering temperature is dependent on the composition of the substrate and sinterable particles, for iron alloy or nickel alloy components, a temperature from about 1,200° F. to about 1,800° F., and preferably from about 1,400° F. to about 1,600° F. for a time from about 45 minutes to 4 hours, and preferably from about 1 hour to 2 hours.

Shrinkage during the sintering process may be detected if the coating step 14 deposits a suspension layer greater than about 10 microns. Preferably, the maximum coating thickness deposited during one coating cycle is on the order of five microns. If a coating thicker than 5-10 microns is desired, multiple coating cycles may be used by repeating 38 the coating and sintering steps. For smooth substrates, complete coverage can usually be achieved with a single coating and sintering cycle. When the substrate is rough and/or porous, multiple coating cycles are typically required to achieve complete coverage. When coating a Media Grade 2 porous substrate, typically three coating cycles are required to achieve complete coverage. For a Media Grade 1 substrate, two coating cycles are usually sufficient, while for a Media Grade greater than 2, several coating cycles may be required for complete coverage. A "Media Grade" number is typically equivalent to a nominal mean flow pore size. For example, a Media Grade 1 substrate is characterized by a nominal mean flow pore size of 1 µm and a Media Grade 2 substrate is characterized by a nominal mean flow pore size of 2 µm. Most applications utilize a Media Grade 0.2 to a Media Grade 5 substrate. However, larger pore size substrates, such as Media Grade 40 or Media Grade 100 may also be coated with the coatings described herein.

Once a coating of a desired thickness has been applied and sintered, either in one or multiple cycles, the coated surface may be finished 40 by secondary operations to cause an exterior portion of the coating to be mechanically deformed. Secondary operations include pressing, rolling, or burnishing to achieve a desired surface finish and/or finer pore size control.

Heating the substrates greatly reduces the number of coating/sintering cycles needed to achieve a desired filtration efficiency. It is believed that when the porous substrate is heated and the coating is applied, the enhanced wicking action and evaporation of the isopropyl alcohol (the carrier fluid for the spray solution) creates a denser and more uniform coating. The use of heated substrates reduces the number of cycles required to coat the original pore structure and results is higher filtration efficiencies with thinner nano scale coatings. In addition, when the coatings are applied to heated substrates, the amount of time that the coating remains as a liquid on the surface of the part is greatly reduced, reducing the time available for the nano particles to re-agglomerate on/in the coatings. It is felt that this also helps to make more uniform nano scale coatings. A suitable temperature range for heated substrates is from 100° F. to 200° F. with a nominal value of about 150° F.

When coating the outside surface of tubes, the tubes are placed in an oven at the desired temperature and then transferred to the coating system prior to spray coating. In this embodiment, no heat is applied to tubes during the coating process. Because the tubes may cool off while transferring them from the oven to the spray system and while coating, we usually set the oven to about 20° F. higher to account for this cooling that will occur during the coating process. An alternative is to apply infra-red (IR) heating to the tubes while coating through the use of explosion proof IR strip heaters to help maintain a constant temperature of the tubes/filters while spray coating.

When coating flat components, such as disk or sheet, the parts may be placed on a porous stainless steel plate that is heated via a hot plate or the like. The use of a porous plate to support the parts serves several functions. First, the composition of the plate can be adjusted to match the alloy of the coated parts to reduce the risk of contamination and is relatively easy to clean and reuse. In addition the porous nature of the support plate causes over spray to dry immediately on contact and, as a result, there is no wicking of the coating solution to the back side of the parts being coated giving cleaner components. Further, the conductive nature of the porous metallic supporting plate aids in transferring heat to and maintaining the elevated temperature of the parts while coating. Small parts are placed directly on the hot plate and their temperature quickly rises to the desired temperature. Larger parts are preferably placed in a preheat oven and then transferred to the hot stage to maintain temperature during coating.

The temperature of the parts is monitored using a non-contact IR thermometer to ensure the desired temperature is attained and the parts are uniform in temperature.

Figure 4:
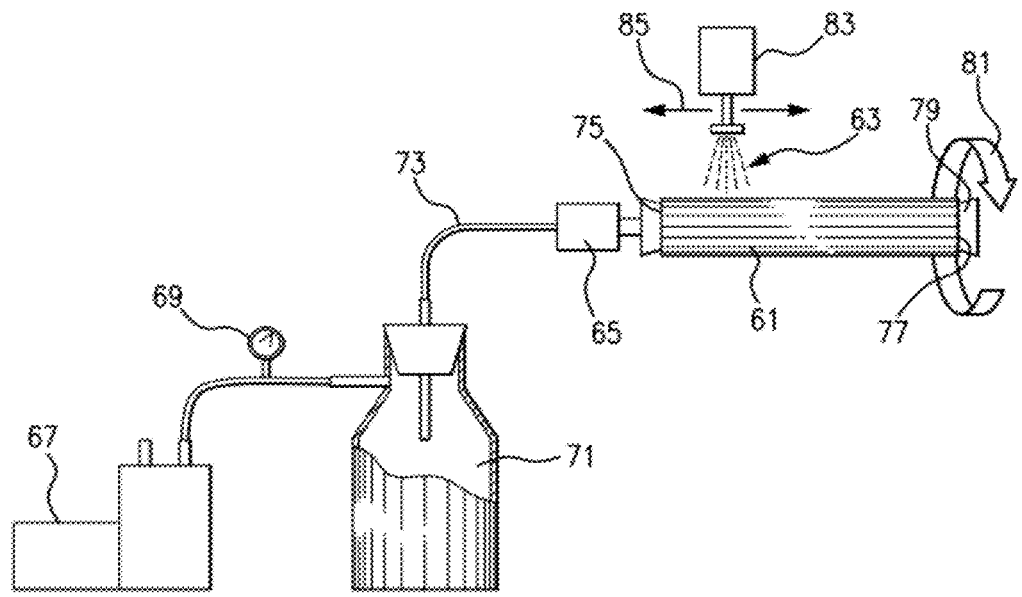
FIG. 4 schematically illustrates a system for depositing the porous coating on a tube in accordance with an embodiment of the invention.

FIG. 4 schematically illustrates a system for rotating a tube 61 and drawing a vacuum while spray coating 63. This technique appears to have a similar effect to heating the tubes. The coatings dried very quickly due to drawing the IPA into the substrate pores and resulted in more dense coatings. Cross section analysis of tubes coated by this system showed some evidence of nano particles being drawn into the near surface internal pores of the tubes. The level of vacuum drawn on the tubes varies by the capacity of the mechanical vacuum pump 67 and the surface area of the tube being coated. It was observed that the levels varied between 10 inches Hg for larger tubes and 25 inches Hg for smaller tubes. As the thickness of the nano coating is built up on the tubes, a noticeable increase in the vacuum level was observed suggesting that the coarser surface pores of the substrate material are being plugged with the deposited nano coating, reducing the air flow through the tubes during the coating process.

An exemplary process is: (1) mechanical pump 67 draws a vacuum to a desired negative pressure as measured by vacuum gage 69; (2) a liquid trap 71 is installed between the vacuum pump 67 and the part 61 to be coated to prevent liquids from entering the vacuum pump 67 and causing damage; (3) a rotary air/vacuum fitting 65 is attached to the vacuum line 73 and to a first end 75 of the tube 61 or part to be coated. An opposing second end 77 of the tube 61 is plugged 79 to force air to be drawn through the porous surface of the tube 61; (4) tube rotation 81 about a longitudinal axis of the tube is turned on as well as heating of the tube if desired; (5) the spray system is enabled and the spray head 83 shuttles 85 a length of the tube 61 to coat its exterior surface; (6) when the surface pores begin to be plugged with the fine coating, a rise in the vacuum level of the system will be observed via vacuum gage 69; shut down the system, remove the tube 61 and sinter bond the applied coating; and (8) repeat until the desired total coating thickness is reached, typically requires three coating/sintering cycles.

Figure 5:
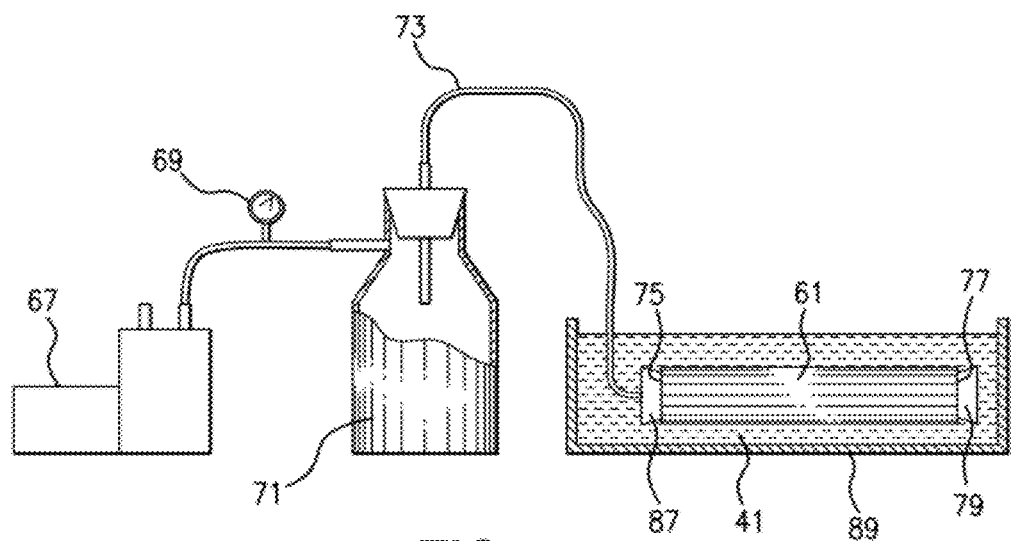
FIG. 5 schematically illustrates a system for depositing the porous coating on a tube in accordance with a second embodiment of the invention.

FIG. 5 schematically illustrates another system to vacuum coat a tube or other structure. A vacuum is drawn on porous tube 61 and the tube then immersed them into a diluted IPA nano powder suspension 41 to form a nano powder cake on the surface of the tube 61. The cake was then sinter bonded to the substrate and repeated until the desired total thickness was achieved. A typical total thickness desired for 316L stainless steel and titanium coating is from 25 to 100 microns to achieve sterilizing grade efficiencies. An advantage of this technique is that the coating was only formed on the porous substrate surfaces. No coating was applied on the welds or attached hardware. This is an advantage as the parts look much better and there is no waste. Metallographic cross sections were performed on tubes coated in this manor and it was observed that unlike the spray coated tubes with a vacuum draw described in reference to FIG. 4 above, no penetration of the nano powder was seen in the internal pores of the substrates by this method.

Applying coatings in this manor using a typical spray coating slurry concentration of 100 grams of powder in 1 liter of isopropyl alcohol, resulted in the coatings being very thick (>50 microns) and forming shrinkage cracks during the sinter process. Preferably, the slurry concentration is diluted to about 10 grams of powder in 1 liter of alcohol to better control the thickness of the coating on the tube 61. As in the spraying technique, a desired coating thickness of around 10 to 25 microns is desired to prevent shrinkage cracks during the sintering process. To control thickness, the vacuum level in the tube was monitored via vacuum gage 69 and coating stopped when the vacuum level increased (pore plugging) or the surface of the tube turned significantly dark. The tube/filter coating was then sintered and recoated using the same process until the desired coating thickness is great enough to reach sterilizing grade performance.

This technique of coating tubes/filters lacks the use of ultrasonics of the slurry and a potential for nano particle agglomeration exists. Agglomeration may be reduced or eliminated by applying ultrasonic energy to the suspension 41 prior to or during part immersion.

An exemplary process is: (1) vacuum pump 67 to draw vacuum; (2) a liquid trap 71 is installed between the vacuum pump 67 and the part 61 to be coated to prevent liquids from entering the vacuum pump and causing damage; (3) a vacuum fitting 87 is attached to a first end 75 of the tube or part to be coated. The opposing second end 77 of the tube 61 is plugged 79 to force fluid flow through the porous surface of the tube 61 towards the tube inside diameter; (4) the tube 61 under vacuum pressure is submersed in a container 89 containing the nano particles in suspension 41 in isopropyl alcohol; (5) when the surface pores begin to be plugged with the fine coating, a rise in the vacuum level of the system will be observed at vacuum gage 69; (6) shut down the vacuum pump 67, remove the tube 61 and sinter bond the applied coating; and (7) repeat until the desired total coating thickness is reached, typically requires three coating/sintering cycles.

For medical and bio-pharmaceutical markets, a sterilizing filter, useful to remove microbes such as bacteria and viruses from a liquid or gas medium requires a pore size of under 0.2 micron. Typical applications for sterilizing grade filters include various implantable devices, filters to prevent plugging of catheters (IV filters), syringe filters, manual and automated drug delivery devices, medical instrumentation, sparging devices for cell culture processing, gas flow restrictor devices for gas delivery in life-critical systems, and bio-pharmaceutical vent filters.

While the method of the invention deposits a nano power coating from a suspension having a carrier fluid that is substantially free of a binder, it is within the scope of the invention to deposit the nano powder coating and then apply a binder as a top coat over the applied coating prior to sintering.

The invention described herein may be better understood by the examples that follow.

EXAMPLES

Example 1

Figure 6:
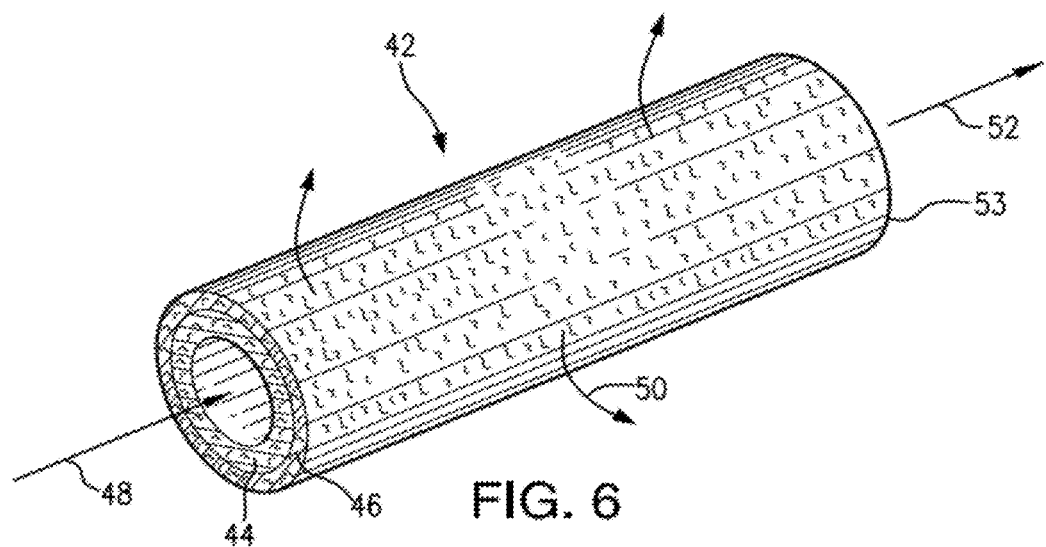
FIG. 6 illustrates a porous tube suitable for gas flow regulation or filtration having a porous coating in accordance with an embodiment of the invention.

Filtration is generally performed using either cross flow or dead ended methods. In cross flow applications, only a portion of the filtrate is filtered in each pass while in dead ended applications, 100% of the fluid being filtered passes through the filter media. A process tube 42 illustrated in FIG. 6 is useful for cross flow filtration and control of gas or liquid flow. The process tube 42 has a porous tubular substrate 44 with relatively large pores on the order of 5 μm. A porous coating 46 having a total coating thickness of about 25 microns and pores on the order of 50 nanometers (nm) in diameter covers the tubular substrate 44. A process gas or liquid 48 flows into the process tube 42. The filtered media 50 is sufficiently small to pass through the micropores of the porous coating 46 and exit through a wall of the process tube 42 while the waste stream 52 exits from an outlet side of the process tube. The process tube 42 depicted in FIG. 3 may also be used for dead ended filtration by plugging exit end 53 of the tube, thereby forcing all of the fluid to pass through the tubular porous substrate 44 and the applied porous coating 46.

The process tube 42 was made with a tubular substrate formed from each one of 316L SS (stainless steel with a nominal composition by weight of 16-18 percent chromium, 10%-14% nickel, 2.0-3.0% molybdenum, less than 0.03% carbon and the balance iron, equally suitable is 316 SS, same composition without the restrictive limitation on carbon content), Inconel 625 (having a nominal composition by weight of 20% chromium, 3.5% niobium, and the balance nickel), and Hastelloy C276. The tubular substrate had pore sizes consistent with Media Grade 2. A slurry of Hastelloy C276 nanopowder and isopropyl alcohol was sprayed on the exterior wall of the tubular substrate to a thickness of between about 5-10 microns. The coating was sintered to the substrate by sintering at 1,475° F. for 60 minutes in a vacuum furnace. The process was repeated two additional times to achieve a total coating thickness of about 25 microns.

Figure 7:
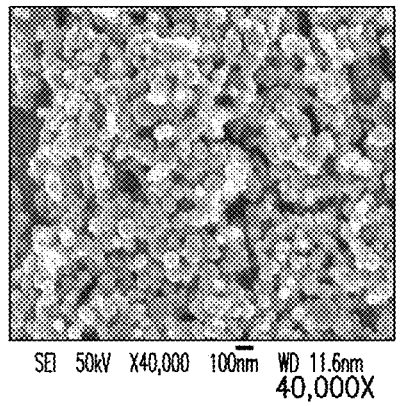
FIG. 7 is a scanning electron micrograph of a surface of the porous coating formed in accordance with an embodiment of the invention.
Figure 8:
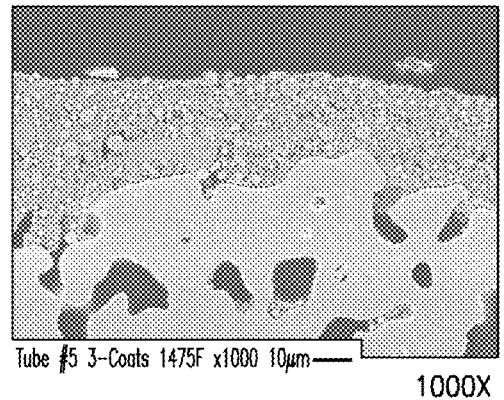
FIG. 8 is a scanning electron micrograph of a cross section of the porous coating of FIG. 4.

FIG. 7 is a scanning electron micrograph of the nanoporous surface at a magnification of 40,000× illustrating the sintered nanoparticles and fine pores. The nanoparticles have an average diameter of about 100 nm and the nanopores have an average pore diameter of about 50 nm. FIG. 8 is a scanning electron microscope at a magnification of 1,000× showing in cross-section the tubular substrate 44 and porous coating 46.

Figure 9:
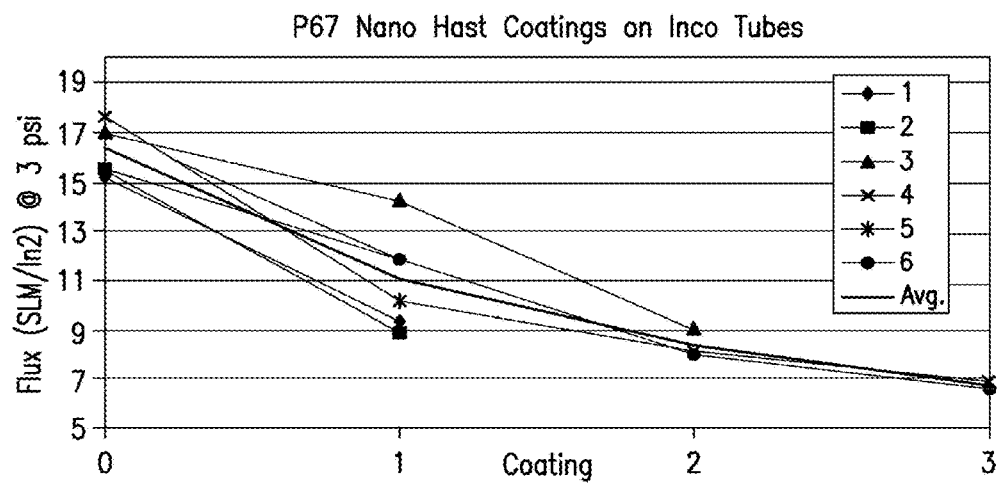
FIG. 9 graphically illustrates the effect of successive layers of the porous coating of FIG. 4 on the gas flux.

The performance of the process tube 42 was measured by determining the flux of nitrogen gas passing through the tube. The flux was measured at room temperature (nominally 22° C.) with a 3 psi pressure drop across the tube wall. The flux units are SLM/in$^2$ where SLM is standard liters per minute and in$^2$ is square inches. Table 1 and FIG. 9 illustrate the flux values for the process tube with from 0 to 3 nano powder coating layers. The average flux on a Media Grade 2 substrate with a total coating thickness of about 25 microns and average pore size of about 50 nm was 6.69 SLM/in$^2$. This compares extremely favorably with a conventional Media Grade 0.5 (nominal mean flow pore size of 0.5 µm) process tube that has a flux of 1.87 SLM/in$^2$ at 3 psi.

TABLE 1

Flux at 3 psi (SLM/in$^2$)

| Coating Layers | Sample Number | | | | | | Average |
| --- | --- | --- | --- | --- | --- | --- | --- |
| | 1 | 2 | 3 | 4 | 5 | 6 | |
| 0 | 15.23 | 15.48 | 17.09 | 17.28 | 17.67 | 15.57 | 16.39 |
| 1 | 9.34 | 8.84 | 14.38 | 11.70 | 10.17 | 11.86 | 11.05 |
| 2 | | | 9.07 | 8.25 | 8.06 | 7.93 | 8.33 |
| 3 | | | | | 6.81 | 6.56 | 6.69 |

Example 2

Figure 10:
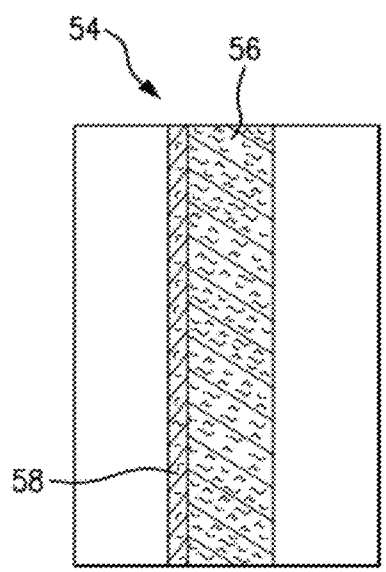
FIG. 10 illustrates a fuel cell component having a porous coating in accordance with an embodiment of the invention.

FIG. 10 illustrates in cross-sectional representation a membrane 54 useful in the production of hydrogen for fuel cell applications. A microporous substrate 56 is coated with a nanocoating 58 of palladium or platinum or their alloys. The substrate pore size is on the order of from 1 to 40 microns and more preferably from 1 to 10 microns. The coating include pores with diameters of from about 50 nm to 10 microns. Subsequent layers may be deposited onto the nanocoating such as by plating or layered deposition to generate an active surface for hydrogen generation.

Example 3

Figure 11:
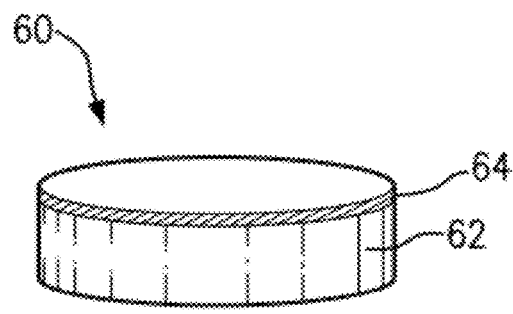
FIG. 11 illustrates a frit for use in a liquid chromatography column having a porous coating in accordance with an embodiment of the invention.

FIG. 11 illustrates a particle retention barrier 60 effective to stop aluminum oxide beads from passing through a liquid chromatography column. The particle retention barrier 60 includes a microporous frit 62 that is typically formed from stainless steel, Hastelloy or titanium powders. Frit 62 has a diameter on the order of 0.082 inch (Media Grade 0.5 to 2). A nano powder layer 64, usually of the same composition as the frit, coats one side of the frit 62. The barrier 60 is formed by micropipetting or spraying a suspension of nano powder onto the surface and then vacuum sintering.

Example 4

Figure 12:
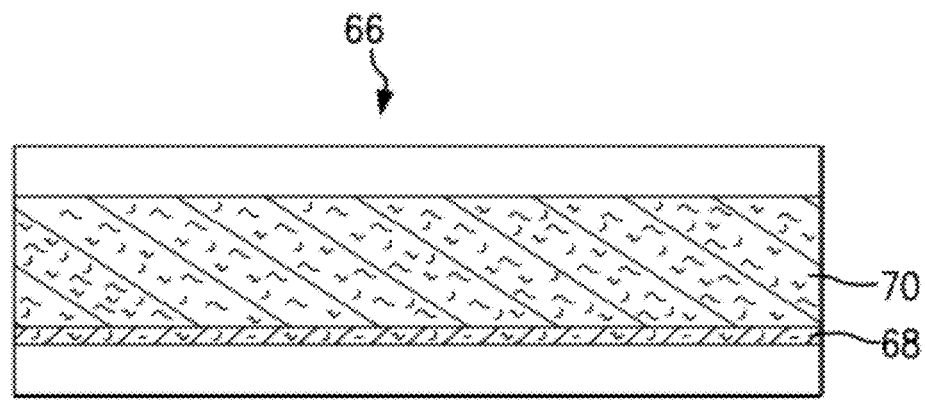
FIG. 12 illustrates a catalytic surface suitable for an industrial catalytic converter having a porous coating in accordance with an embodiment of the invention.

FIG. 12 illustrates a component 66 for improved catalytic performance. A nano powder layer 68 of platinum or other catalytic material coats a surface of a metal or ceramic support 70 for use in a catalytic converter, for industrial applications and/or automotive uses.

Example 5

Figure 13:
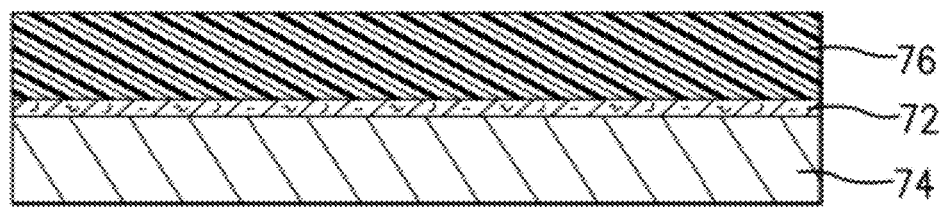
FIG. 13 illustrates an adhesively bonded composite having a porous coating effective to enhance adhesion in accordance with an embodiment of the invention.

FIG. 13 illustrates a nano powder coating 72 applied to a surface of a substrate 74 to increase the surface area and provide locking pores for a polymer adhesive 76 thereby dramatically increasing the strength of the adhesive bond.

Example 6

An example of creating a dilute distribution of isolated particles in a coating would be to create a 1:100 mixture of platinum particles in a stainless steel powder and then depositing this mixture onto a stainless steel substrate and sinter bonding. In this example, which would apply to a catalyst coating for fuel cell applications, one ends up with isolated platinum particles in a stainless steel surface. Here the stainless steel powder in the coating becomes indistinguishable from the substrate and the dilute platinum particles from the original coating are distributed over the surface of the substrate.

Example 7

An example of bonding stainless steel to a substrate at lower temperatures would be to mix a lower temperature melting powder like tin with stainless steel 316L SS powder that has a much higher melting temperature, coating the substrate with this mixture, and then follow up with sintering. The lower temperature component (tin) would diffuse at much lower temperatures than the stainless steel thus causing sintering and bonding at lower temperatures.

Example 8

A sterilizing filter, useful to remove microbes such as bacteria and viruses from a liquid or gas medium requires a pore size effective to capture microbes greater than 0.2 micron. Filter sterilization discs were made by the ultrasonic spray deposition process described above and their effectiveness to remove bacteria evaluated. The operating parameters were:
  47 mm diameter disks with 1" MG2 stainless steel filter inserts
  Heated Substrate: 150 F
  Spray head speed: 50 min/sec
  Spray Head Distance: 2.5 inches
  Fluid flow rate: 6 ml/min
  Ultrasonic energy levels (Spray gun 6-Watts, Agitator 4-Watts)
  Suspension: 100 grams of 316L SS powder in 1 liter of IPA
  2 Spray coats, Sintered, Repeated 5 times
  Sintering Temperature: 1350 F
  Typical IPA bubble point>20"Hg
  Typical Water bubble point: >30"Hg
  IPA Flow Rate: 1.13 mL/min/cm$^2$ @ 10 psi
  Nitrogen Flow Rate: 410 mL/min/cm$^2$ @ 10 psi
  LRV Efficiencies: >7 LRV (@ 0.2 micron particle size, LRV=Log Reduction Value)
  Microbial retention ASTM F838-05 or equivalent: Passed

TABLE 3

Figure 14:
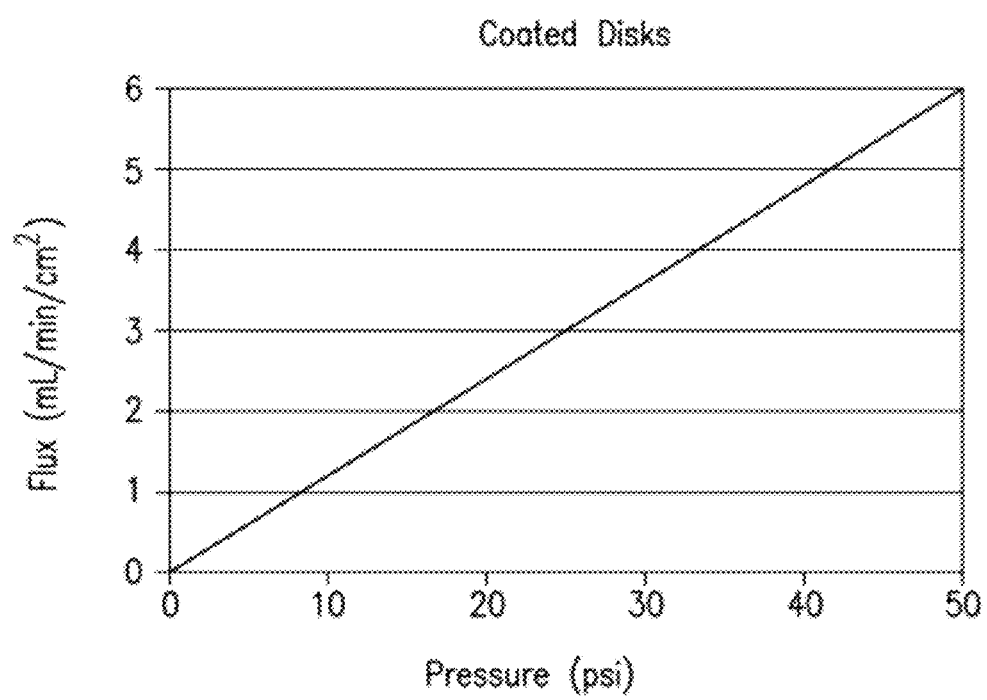
FIG. 14 graphically illustrates isopropyl alcohol (IPA) liquid flow through 47 mm disk assemblies in accordance with Example 8.

See FIG. 14

| Pressure (psi) | Temp C. | Flow (ccm) | Flow (sccm) | Corrected Flux (mL/min/cm²) |
|---|---|---|---|---|
| 0 | 0 | 0 | 0 | 0 |
| 2.5 | 20.82 | 1.27 | 1.30 | 0.26 |
| 5 | 20.90 | 2.69 | 2.75 | 0.54 |
| 10 | 21.16 | 5.65 | 5.71 | 1.13 |
| 15 | 21.18 | 8.85 | 8.95 | 1.77 |
| 20 | 21.13 | 11.76 | 11.90 | 2.35 |
| 25 | 21.09 | 14.88 | 15.08 | 2.98 |
| 50 | 20.89 | 30.23 | 30.84 | 6.09 |

Liquid IPA Flow Data for 47 mm disk assemblies

TABLE 4

Figure 15:
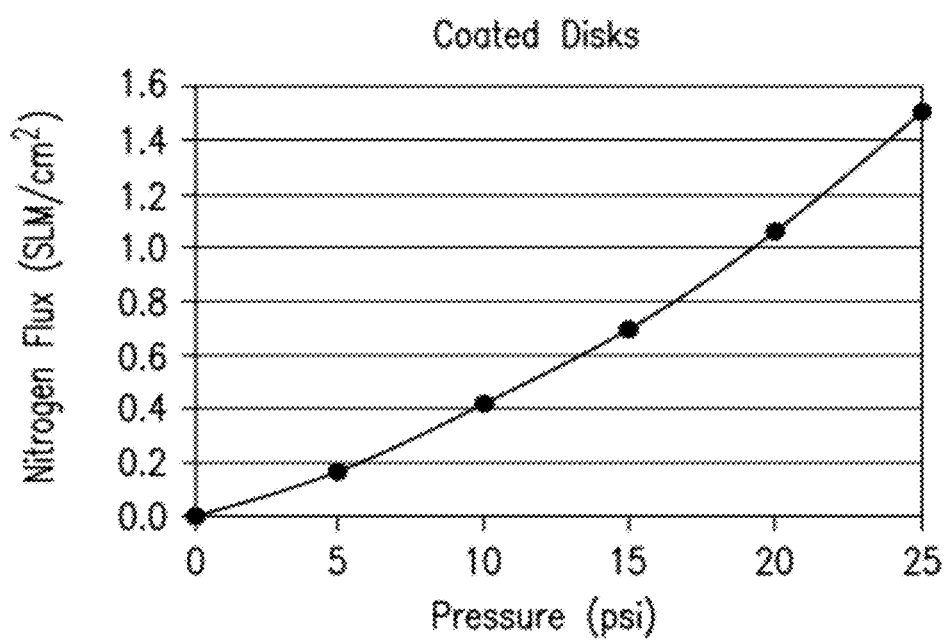
FIG. 15 graphically illustrates nitrogen flow through 47 mm disk assemblies in accordance with Example 8.

See FIG. 15

| Pressure | Flow (SLM) | | | | | Avg. | Flux SLM/cm² |
| | Disk 1 | Disk 3 | Disk 5 | Disk 6 | Disk 8 | Disk 15 | | |
|---|---|---|---|---|---|---|---|---|
| 0 | | | | | | 0 | 0.00 | |
| 5 | 0.8 | 0.8 | 0.9 | 0.9 | 0.8 | 0.8 | 0.83 | 0.16 |
| 10 | 2.1 | 2 | 2.2 | 2.4 | 1.8 | 2 | 2.08 | 0.41 |
| 15 | 3.6 | 3.4 | 3.7 | 4 | 3.1 | 3.4 | 3.53 | 0.70 |
| 20 | 5.4 | 5.2 | 5.6 | 6.2 | 4.6 | 5.2 | 5.37 | 1.06 |
| 25 | 7.7 | 7.3 | 7.9 | 8.8 | 6.5 | 7.3 | 7.58 | 1.50 |

Nitrogen gas flow data for 47 mm disk assemblies

For microbial retention testing per ASTM F838-05, all equipment was sterilized/disinfected prior to use. All testing was conducted in a laminar flow hood. Prior to processing each filter, a control was prepared by filtering a minimum of 100 mL of sterile buffer through the test filter. One hundred milliliters of filtrate was aseptically collected downstream of the test filter in a sterile container. The filtrate was filtered using a microbial retentive filter. The microbial retentive filter was placed onto Plate Count Agar and allowed to incubate at 30±2° C. for 7 days. A 48 hour pre-count was performed on each filter.

After the control was processed, the test filter was challenged with approximately $3 \times 10^7$ to $5 \times 10^7$ CFU/100 mL of *B. diminuta*. One hundred milliliters of filtrate was aseptically collected downstream of the test filter in a sterile container. The filtrate was filtered using a microbial retentive filter. The microbial retentive filter was placed onto Plate Count Agar and allowed to incubate at 30±2° C. for 7 days. A 48 hour pre-count was performed on each filter.

Table 2 sets out the effectiveness of the sterilizing filters produced herein:

TABLE 2

| Sample Description | CFU/100 mL (CFU = Colony Forming Units) | | Bacterial Retention of Challenge Organism |
| | Test | Control | |
|---|---|---|---|
| Disc #1 | 0 | 0 | Pass |
| Disc #3 | 0 | 0 | Pass |
| Disc #5 | 0 | 0 | Pass |
| Disc #6 | 0 | 0 | Pass |
| Disc #8 | 0 | 0 | Pass |
| Disc #15 | 0 | 0 | Pass |

Example 9

A high efficiency filter for removing impurities from a gas or liquid medium utilizes depth filtration processes. An example of this would be to apply a relatively thick coating on the order of 200 microns on to a supporting substrate that utilizes the depth filtration technique to capture the very fine particulate/microbes for this kind of filtration. To build up this thickness, several thinner layers would be applied and sintered as described in the application to minimize shrinkage cracks during the sintering process.

Example 10

Figure 16A:
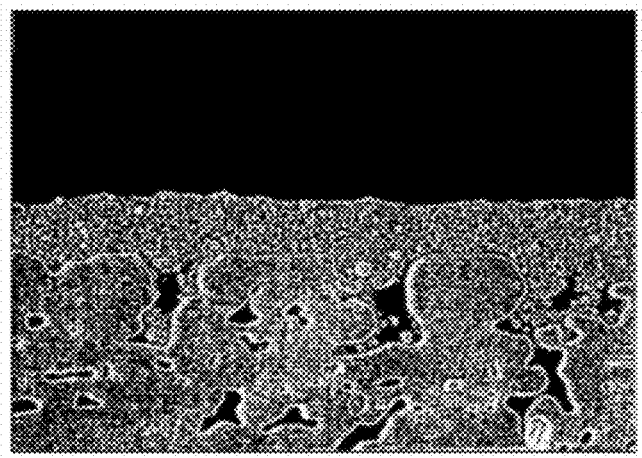
FIGS. 16A and 16B are photomicrographs of a Media Grade 2 substrate coated with stainless steel nano particles by the process of FIG. 3.
Figure 16B:
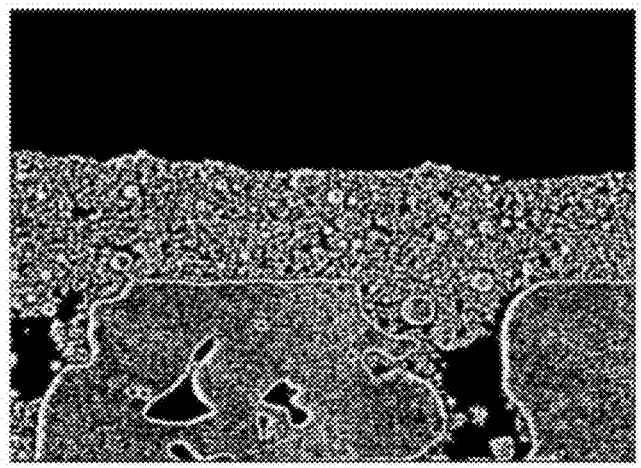

FIGS. 16A and 16B are cross-sectional images at magnifications of 500 times and 1000 times, respectively, of a Media Grade 2 substrate coated with 316L stainless steel nanoparticles according to the method illustrated in FIG. 3. The operating parameters were:
Heated Substrate: 150 F
Spray head speed: 50 mm/sec
Spray Head Distance: 2.5 inches
Fluid flow rate: 3 ml/min
Ultrasonic energy levels (Spray gun 6-Watts, Agitator 4-Watts)
Suspension: 25 grams of 316L SS powder in 1 liter of IPA
2 Spray coats, Sintered, 2 additional spray coats and sintered.
Sintering Temperature: 1425 F
Typical IPA bubble point >20"Hg
No flow data Available Example 11

Figure 17A:
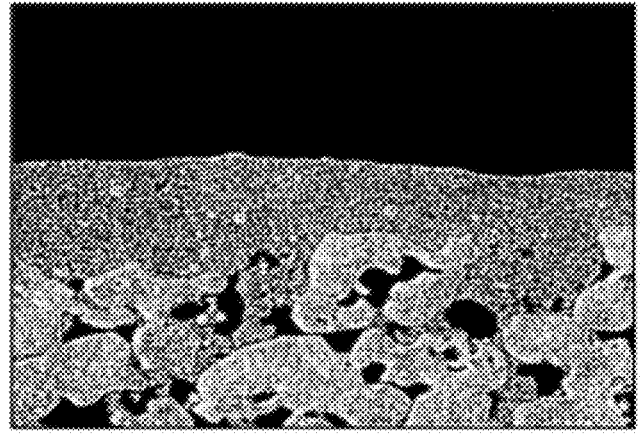
FIGS. 17A and 17B are photomicrographs of a tubular Media Grade 2 substrate coated with stainless steel nano particles by the process of FIG. 4.
Figure 17B:
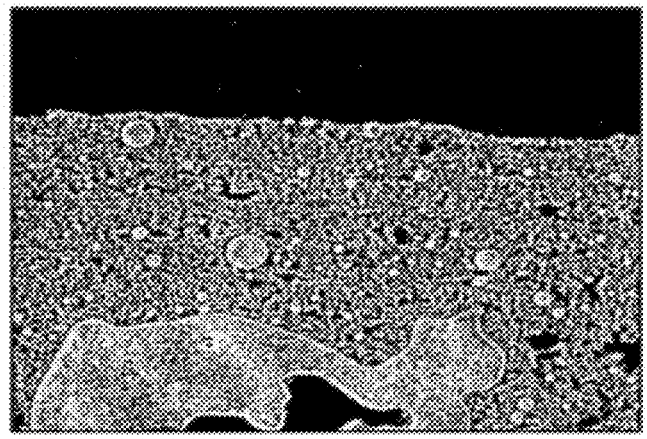
Figure 18:
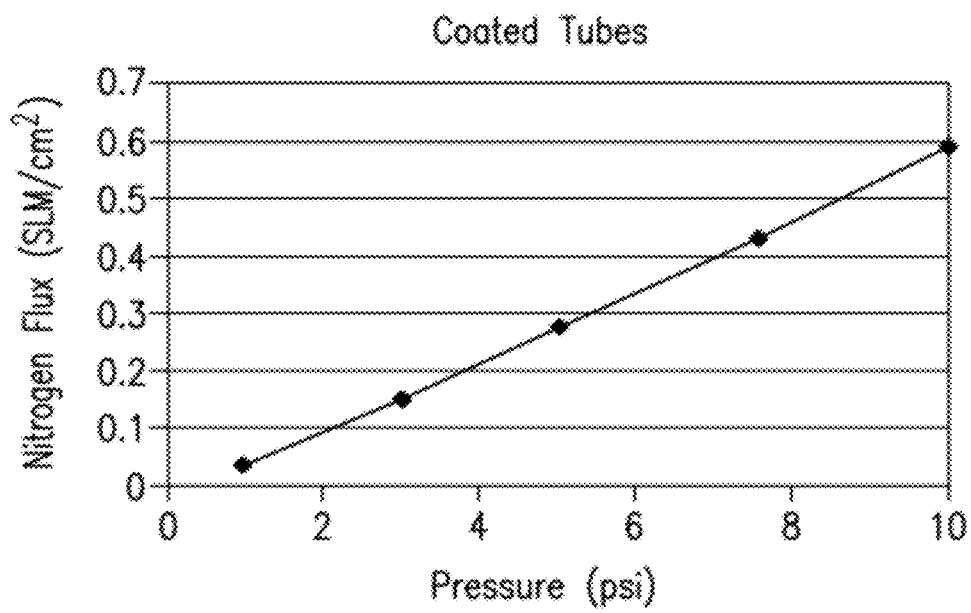
FIG. 18 graphically illustrates nitrogen flow through 0.5 inch OD coated tubes in accordance with Example 11.
Figure 19:
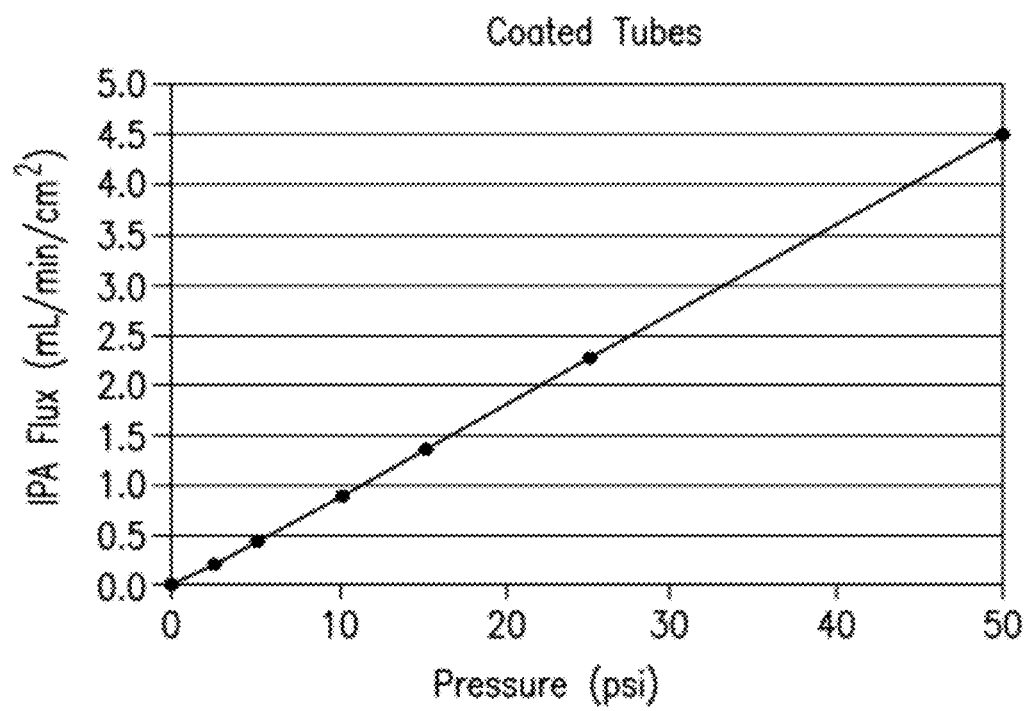
FIG. 19 graphically illustrates IPA liquid flow through 0.5 inch OD coated tubes in accordance with Example 11.

FIGS. 17A and 17B are cross-sectional images at magnifications of 350 times and 1000 times, respectively, of a Media Grade 2 tubular substrate coated with 316L stainless steel nanoparticles according to the method illustrated in FIG. 4. The operating parameters were:
½" OD MG2 Tubes×5 inches long
Alloy 316L SS
Tubes heated to 160 F prior to coating
Rotation speed: 100 RPM
Spray head speed: 3 mm/sec
Spray Head Distance: 2.0 inches
Fluid flow rate: 3 ml/min
Ultrasonic energy levels (Spray gun 6-Watts, Agitator 4-Watts)
Suspension: 25 grams of 316L SS powder in 1 liter of IPA
2 spray passes and then sintered, repeated three more times
Total coating thickness: 30-60 microns
Sintering temperature: 1515 F
Typical IPA bubble point: >20"Hg
Typical Water bubble point: >30"Hg
IPA Flow Rate: 0.89 mL/min/cm² @ 10 psi
Nitrogen Flow Rate: 590 mL/min/cm² @ 10 psi
LRV Efficiencies 9 to 12 log @ 0.2 micron particles
FIG. 18 graphically illustrate nitrogen gas flow for 0.5 inch outside diameter coated tubes and FIG. 19 graphically illustrates IPA liquid flow for the same tubes.

Example 12

Figure 20:
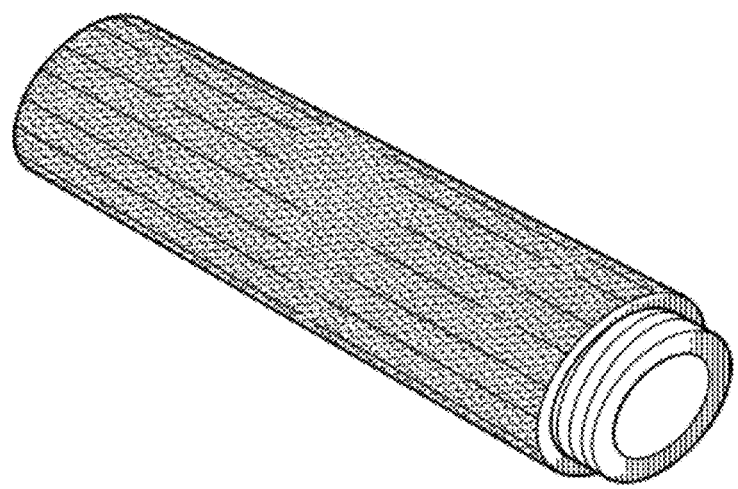
FIG. 20 is a photograph of a bio-pharmaceutical vent filter in accordance with Example 12.

FIG. 20 is a photograph of a 10" Bio-Pharmaceutical Vent Filter for Sterilizing Grade Applications made from 316L stainless steel and nanoparticles according to the method illustrated in FIG. 4. The operating parameters were:

2½" ISO Pressed Tubes or Rolled & Welded Cartridges welded to a 226 interface flange
Alloy 316L SS
Substrate Media Grade: 2
Tubes heated to 160 F prior to coating
Rotation speed: 100 RPM
Spray head speed: 2 mm/sec
Spray Head Distance: 1.5 inches
Fluid flow rate: 5 ml/min
Air pressure 10"$H_2O$
Ultrasonic energy levels (Spray gun 6-Watts, Agitator 4-Watts)
Suspension: 25 grams of 316L SS powder in 1 liter of IPA
1 spray passes and then reheated to 160 F followed a second spray coat
Spray coating and sintering cycle repeated three times
Total coating thickness: 30-75 microns
Sintering temperature: 1500 F in hydrogen
Furnace: Sinterite Belt furnace running at 6 inches/min Example 13

Figure 21:
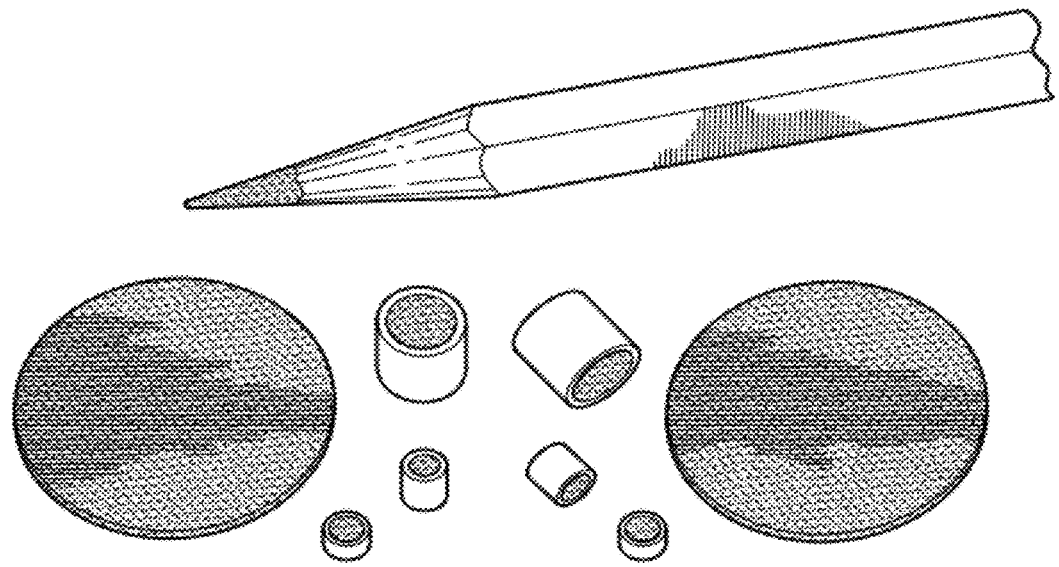
FIG. 21 is a photograph of small parts for sterilizing grade filtration in accordance with Example 13.

FIG. 21 is a photograph of several Small Parts for Sterilizing Grade Filtration for use in Medical devices made from 316L stainless steel and nanoparticles according to the method illustrated in FIG. 3. The operating parameters were:
Parts: Disks and/or sleeved restrictors
Substrate material: 316L Stainless Steel
Heated Substrate: 150 F
Spray head speed: 50 min/sec
Spray Head Distance: 2.5 inches
Fluid flow rate: 3 ml/min
Ultrasonic energy levels (Spray gun 6-Watts, Agitator 4-Watts)
Suspension: 25 grams of 316L SS 80-100 ηm average particle size powder in 1 liter of IPA
2 Spray coats, Sintered, 2 additional spray coats and sintering cycles.
Sintering Temperature: 1425 F
Sintering Atmosphere: Hydrogen
Sintering Time: 60 minutes The above products of Examples 12 ands 13 may be fabricated using titanium as well. The same process is followed except we change the materials to titanium and sinter in an Argon atmosphere.

Example 14

This example is similar to Example 8 utilizing titanium instead of stainless steel and the processing conditions are slightly different. A sterilizing filter, useful to remove microbes such as bacteria and viruses from a liquid or gas medium requires a pore size effective to capture microbes greater than 0.2 micron. Filter sterilization disks were made by the ultrasonic spray deposition process previously described and their effectiveness to remove bacteria evaluated. Here the materials of construction are titanium which makes this filter suitable for medical uses and for implantable applications. The operating parameters were:
47 mm diameter disks with 1" MG0.5 titanium filter inserts
Heated Substrate: 140 F
Spray head speed: 100 mm/sec
Spray Head Distance: 2.5 inches
Fluid flow rate: 6 ml/min
Ultrasonic energy levels (Spray gun 6-Watts, Agitator 4-Watts)
Suspension: 100 grams of titanium powder in 1 liter of IPA
2 Spray coats, Sintered, Repeated 4 times
Sintering Temperature: 1610 F
Typical IPA bubble point>20"Hg
Typical Water bubble point: >30"Hg
Microbial retention ASTM F838-05 or equivalent: Passed Example 15

A larger flat plate useful as a sterilizing vent filter to provide a sterile barrier between ambient air and a sterile enclosure such as a medical transport tray was formed in accordance with the following:
5"×5"×0.062" thick 316L stainless steel porous plate with an average pore size about 0.5 microns.
Heated Substrate: 180 F
Spray head speed: 100 mm/sec
Spray Head Distance: 2.5 inches
Fluid flow rate: 6 ml/min
Ultrasonic energy levels (Spray gun 6-Watts, Agitator 4-Watts)
Suspension: 100 grams of 316L Stainless steel powder in 1 liter of IPA
2 Spray coats, Sintered, Repeated 5 times
Sintering Temperature: 1550 F
Typical IPA bubble point>20"Hg One or more embodiments of the present invention have been described. Nevertheless, it will be understood that various modifications may be made without departing from the spirit and scope of the invention. Accordingly, other embodiments are within the scope of the following claims.

What is claimed is:

1. A method for forming a porous coating on a porous substrate, comprising the steps of:
   (a) forming a suspension of sinterable particles in a carrier fluid and containing said suspension in a reservoir;
   (b) maintaining said suspension by agitation in said reservoir;
   (c) transferring said suspension from said reservoir to a first non-cavitating in-line ultrasonic agitator that agitates said suspension without cavitation;
   (d) transferring said suspension from said first non-cavitating ultrasonic in-line agitator to a selector valve;
   (e) selectively transferring said suspension from said selector valve to either an ultrasonic spray nozzle or back to said reservoir;
   (f) heating said porous substrate;
   (g) when said suspension is transferred to said ultrasonic spray nozzle, applying a first coating of said suspension to said heated porous substrate;
   (h) subsequent to completion of step (g), selectively transferring said suspension from said selector valve back to said reservoir and sintering said sinterable particles to said substrate thereby forming a coated porous substrate.

2. The method of claim 1 including interposing a pump between said reservoir and said first non-cavitating in-line ultrasonic agitator and interposing a second non-cavitating ultrasonic inline agitator that agitates said suspension without cavitation between said reservoir and said pump.

3. The method of claim 2 including adjusting a space between an orifice of said ultrasonic spray nozzle and said substrate to be from one inch to three inches.

4. The method of claim 2 wherein said pump is effective to dispense a precise volume of fluid per shaft revolution between said first ultrasonic inline agitator and said ultrasonic spray nozzle.

5. The method of claim 4 wherein said sinterable particles are selected to have an average particle size of from 50 nanometers to 350 nanometers.

6. The method of claim 5 wherein said suspension is formed with from 10 grams per liter to 200 grams per liter of sinterable particles in a carrier fluid.

7. The method of claim 5 wherein said sinterable particles are selected to be stainless steel.

8. The method of claim 7 wherein said coated substrate is effective to remove microbes from a fluid medium.

9. The method of claim 1 including heating said substrate to a temperature of from 120° F. to 220° F. immediately prior to said applying step.

10. The method of claim 9 including selecting said carrier fluid to be water, isopropanol or a mixture thereof and maintaining said substrate at a temperature of between 100° F. and 150° F. during said applying step.

11. The method of claim 10 wherein a heat source is adjacent a first side of said substrate while said first coating is applied to an opposing second side of said substrate.

12. A method for forming a porous coating on a tubular porous substrate having an interior bore, comprising the steps of:
 (a) forming a suspension of sinterable particles in a carrier fluid and containing said suspension in a reservoir;
 (b) maintaining said suspension by agitation in said reservoir;
 (c) transferring said suspension from said reservoir to a selector valve;
 (d) selectively transferring said suspension from said selector, valve to either a spray nozzle or back to said reservoir;
 (e) when said suspension is transferred to said spray nozzle, including interposing a non-cavitating ultrasonic in-line agitator that agitates said suspension without cavitation between said reservoir and said spray nozzle, applying a first coating of said suspension to said porous substrate that has been heated to a temperature of from 100° F. and 200° F. immediately prior to said applying step; and
 (f) sintering said sinterable particles to said porous substrate thereby forming a coated substrate.

13. The method of claim 12 including applying a vacuum to said interior bore during said applying step.

14. The method of claim 13 including rotating said tube about a longitudinal axis thereof during said applying step.

15. The method of claim 14 including shuttling said spray nozzle along a longitudinal axis of said tube during said applying step until outside surfaces of said tube are covered with said porous coating.

16. The method of claim 13 including shuttling said spray nozzle along a longitudinal axis of said tube during said applying step.

17. The method of claim 14 including selecting said carrier fluid to be water, isopropanol or a mixture thereof.

18. The method of claim 17 including shuttling said spray nozzle along a longitudinal axis of said tube during said applying step until outside surfaces of said tube are covered with said porous coating.

\* \* \* \* \*